United States Patent
Tada et al.

(10) Patent No.: US 10,999,713 B2
(45) Date of Patent: May 4, 2021

(54) INFORMATION PROVIDING APPARATUS FOR CONTROLLING OUTPUT OF INFORMATION AND CONTROL METHOD THEREOF

(71) Applicant: HONDA MOTOR CO., LTD., Tokyo (JP)

(72) Inventors: Masahiro Tada, Wako (JP); Lei Tian, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/289,862

(22) Filed: Mar. 1, 2019

(65) Prior Publication Data

US 2019/0289436 A1    Sep. 19, 2019

(30) Foreign Application Priority Data

Mar. 19, 2018   (JP) .............................. JP2018-051142

(51) Int. Cl.

| H04W 4/08 | (2009.01) |
|---|---|
| H04W 4/48 | (2018.01) |
| H04L 29/08 | (2006.01) |
| G06N 5/04 | (2006.01) |

(52) U.S. Cl.
CPC ................ *H04W 4/08* (2013.01); *G06N 5/04* (2013.01); *H04L 67/12* (2013.01); *H04W 4/48* (2018.02)

(58) Field of Classification Search
CPC ........... H04W 4/08; H04W 4/48; H04W 4/40; G06N 5/04; H04L 51/046
USPC ....................................................... 340/1.1
See application file for complete search history.

(56) References Cited

U.S. PATENT DOCUMENTS

| 2012/0173635 | A1* | 7/2012 | Wormald ............. | G06Q 10/107 |
|---|---|---|---|---|
| | | | | 709/206 |
| 2016/0057090 | A1 | 2/2016 | Faaborg | |
| 2018/0375986 | A1* | 12/2018 | Blanco ................ | H04M 1/7255 |

FOREIGN PATENT DOCUMENTS

| CN | 106575344 A | 4/2017 |
|---|---|---|
| JP | 2016-122228 A | 7/2016 |

OTHER PUBLICATIONS

Chinese Office Action (with partial translation) for Chinese Patent Application No. 201910146094.6 dated Feb. 22, 2021.

* cited by examiner

*Primary Examiner* — Vernal U Brown

(74) *Attorney, Agent, or Firm* — Thomas | Horstemeyer, LLP (57) ABSTRACT

An information providing apparatus of the present disclosure controls the output of information. The information providing apparatus includes a receiving unit that can receive a message. In addition, the information provide apparatus includes an output control unit that outputs the received message in a manner perceptible to multiple people. Further, the information apparatus includes a determination unit that determines whether the received message is a message addressed to a specific person among the multiple people. In a case where it is determined that the received message is a message addressed to the specific person, the output control unit can change an output mode of the received message, based on an attribute shared between the specific person and another person among the multiple people.

12 Claims, 8 Drawing Sheets

| | COWORKER | FRIEND | FAMILY |
|---|---|---|---|
| OCCUPANT A | ○ | ○ | |

| | COWORKER | FRIEND | FAMILY |
|---|---|---|---|
| OCCUPANT B | ○ | ◎ | |

503

←——————————————→
TIGHTER   CONSTRAINT ON   LOOSER
           INFORMATION OUTPUT

FIG. 5C

| | COWORKER | FRIEND | FAMILY |
|---|---|---|---|
| OCCUPANT B | ○ | ◎ | |
| OCCUPANT C | | | ○ |

503
504

←——————————————→
TIGHTER   CONSTRAINT ON   LOOSER
           INFORMATION OUTPUT

|  | COWORKER | FRIEND | FAMILY |
|---|---|---|---|
| WORK EMAIL | DISPLAY SUMMARY ON PANEL DISPLAY UNIT | NON-DISPLAY | NON-DISPLAY |
| PRIVATE EMAIL | DISPLAY ON RECEPTION NOTIFICATION ON PANEL DISPLAY UNIT | DISPLAY SUMMARY ON NAVIGATION DISPLAY UNIT | DISPLAY ENTIRE TEXT ON NAVIGATION DISPLAY UNIT |
| SNS MESSAGE | NON-DISPLAY | READ OUT SUMMARY BY SOUND OUTPUT | READ OUT ENTIRE TEXT BY SOUND WAS OUTPUT |

FIG. 8

INFORMATION PROVIDING APPARATUS FOR CONTROLLING OUTPUT OF INFORMATION AND CONTROL METHOD THEREOF

CROSS-REFERENCE TO RELATED APPLICATION(S)

This application claims priority to and the benefit of Japanese Patent Application No. 2018-051142 filed on Mar. 19, 2018, the entire disclosure of which is incorporated herein by reference.

BACKGROUND OF THE INVENTION

Field of the Invention

The present invention relates to an information providing apparatus for controlling output of information and a control method thereof.

Description of the Related Art

In recent years, a technology for a navigation apparatus to acquire information unrelated to routing assistance and output the acquired information as output information (e.g., sound, video) has been known (Japanese Patent Laid-Open No. 2016-122228). Also, Japanese Patent Laid-Open No. 2016-122228 discloses a technology for the navigation apparatus to judge whether or not there is a passenger, using information from a load sensor or the like installed in a seat, and to ensure that output information is not output in the case where it is judged that there is a passenger.

Incidentally, when an information providing apparatus that includes a navigation apparatus or the like receives information addressed to a specific person, there are cases where, even if there is a person in the vicinity such as a passenger, outputting that information in a manner also perceptible to the person who is in the vicinity would add to the atmosphere or convey the information effectively. On the other hand, depending on the person who is in the vicinity (e.g., coworker, family, etc.), there are also cases where it is desirable to ensure that received information is not output or to output only part of the received information. While Japanese Patent Laid-Open No. 2016-122228 discloses a technology for controlling whether or not output information is output according whether there is a passenger, output of information that takes account of the relationship with a person who is in the vicinity is not taken into consideration.

SUMMARY OF THE INVENTION

The present invention has been made in consideration of the aforementioned problems, and realizes a technology that, in the case where received information can be output to a plurality of persons, enables an output mode to be changed with consideration for the relationship of the persons.

In order to solve the aforementioned problems, one aspect of the present invention provides an information providing apparatus comprising: a receiving unit configured to receive a message; one or more processors; and a memory storing instructions which, when the instructions are executed by the one or more processors, cause the information providing apparatus to function as: an output control unit configured to output the received message in a manner perceptible to a plurality of persons; and a determination unit configured to determine whether the received message is a message addressed to a specific person among the plurality of persons, wherein the output control unit, in a case where it is determined by the determination unit that the received message is a message addressed to the specific person, changes an output mode of the received message, based on an attribute shared between the specific person and another person among the plurality of persons.

Another aspect of the present invention provides a control method of an information providing apparatus that includes a receiving unit configured to receive a message and an output control unit configured to output the received message in a manner perceptible to a plurality of persons, the method comprising: determining whether the received message is a message addressed to a specific person among the plurality of persons; and changing, in a case where it is determined in the determining that the received message is a message addressed to the specific person, an output mode of the received message, based on an attribute shared between the specific person and another person among the plurality of persons.

According to the present invention, it is possible, in the case where received information can be output to a plurality of persons, to change the output mode with consideration for the relationship of the persons.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Hereinafter, illustrative embodiments of the present invention will be described in detail, with reference to the drawings. Note that, in the following description, the case where information providing apparatuses 200 are disposed inside vehicles, and information is output to a person who is in the interior space of one vehicle will be described as an example. However, the present invention is not limited to this embodiment, and is also applicable to cases such as where information is output to persons who are in the interior space of a plurality of separate vehicles, or where information is output to a plurality of persons who are in a conference room or a house (or a plurality of separate rooms).

Configuration of Information Providing System

Figure 1:
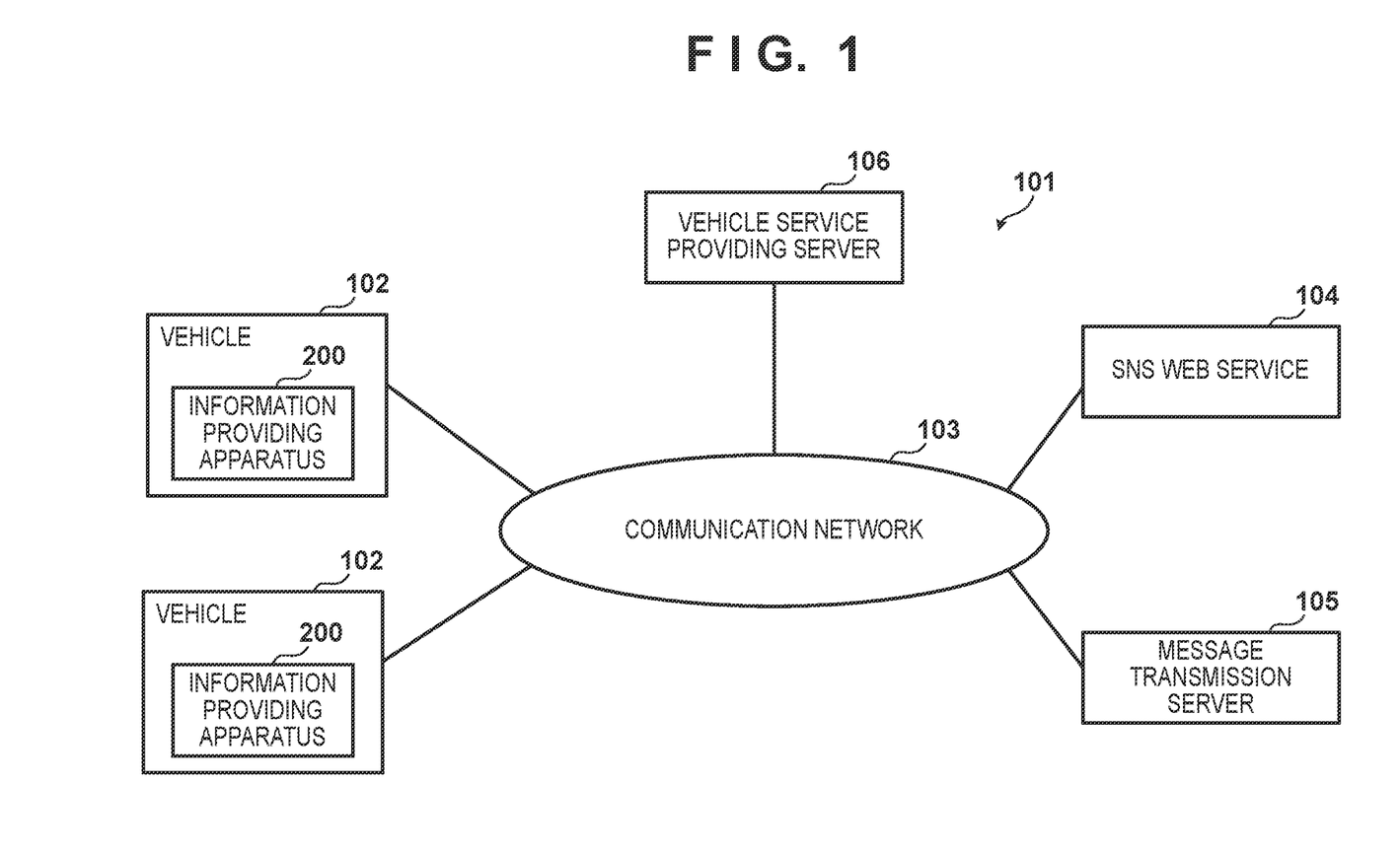
FIG. 1 is a diagram showing an example of an information providing system according to a first embodiment.

A configuration of an information providing system 101 according to the present embodiment will be described, with reference to FIG. 1. Vehicles 102 are vehicles that travel on four wheels, for example, and a plurality of persons can ride inside the vehicle. The information providing apparatus 200, which is capable of outputting information in a manner perceptible to a plurality of persons, is disposed inside the vehicle.

A network 103 includes a communication network such as the Internet or a mobile phone network, for example, and transmits information between the information providing apparatus 200 and various servers that are connected to the network 103. An SNS web service 104 holds information (social graph information, group information, etc.) indicating the relationship between users who have subscribed to the service, and provides information indicating the relationship between the users externally as a web service.

A message transmission server 105 provides a message service for users who have subscribed to the service. The message service includes messaging services such as email, SMS and SNS services, for example. A message includes perceptible information such as text, images and sound, for example. Usually, messages are transmitted to a terminal (e.g., smartphone terminal, etc.) set by a user who has subscribed to the service, but messages can be transmitted to the information providing apparatus 200 when occupant registration processing in the information providing apparatus 200 which will be described later is carried out.

A vehicle service providing server 106 has an occupant information database storing occupant information registered or collected for each person, such as information of a driver registered by the driver and information of passengers registered when the passengers ride in the vehicle, for example. The occupant information is provided from the information providing apparatuses 200 of a plurality of vehicles. Attribute information (e.g., family, friend, coworker) between occupants (includes driver and passengers) registered in the information providing apparatuses 200 in the past may be uploaded from the information providing apparatuses 200 and stored in the occupant information database.

Configuration of Information Providing Apparatus

Figure 2:
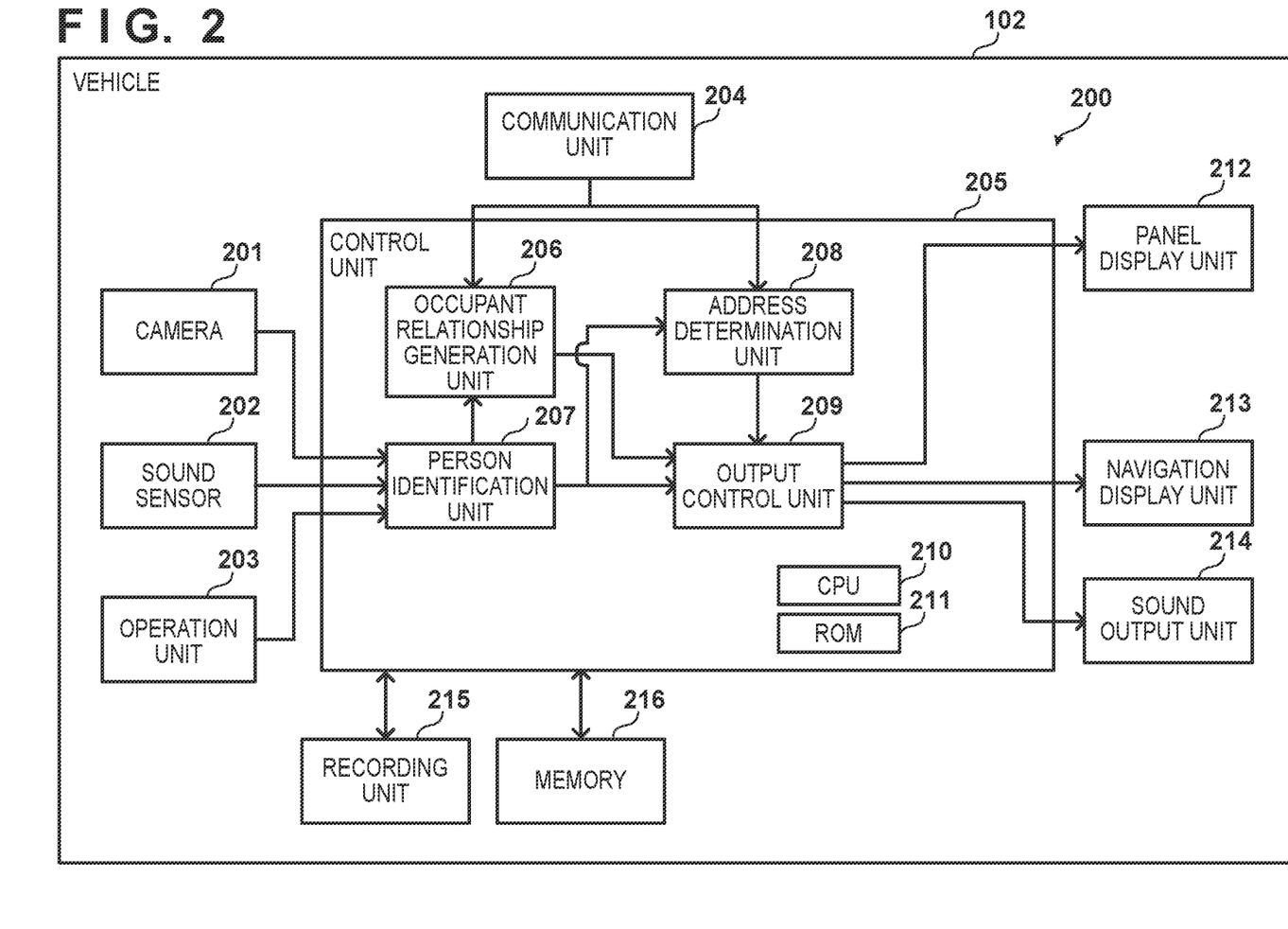
FIG. 2 is a block diagram showing an exemplary functional configuration of an information providing apparatus according to the first embodiment.

Next, an exemplary functional configuration of the information providing apparatus 200 will be described, with reference to FIG. 2. In FIG. 2, the main functional blocks and main connection relationships of the information providing apparatus 200 that is disposed inside a vehicle are represented. Each of the functional blocks that are shown in FIG. 2 may be integrated or separated, and the functions that will be described may be realized by different blocks. Also, elements described as hardware may be realized by software, and vice versa.

The camera 201 acquires the situation inside the vehicle as image information. In the present embodiment, the camera 201 acquires facial images for identifying the persons (occupants) riding in the vehicle 102. A sound sensor 202 acquires sounds uttered inside the vehicle by the occupants. In the present embodiment, sounds for identifying the passengers of the vehicle 102 are acquired. An operation unit 203 includes buttons, dials, a touch input type panel and the like for occupants such as the driver to give operation instructions to the information providing apparatus 200, and accepts input operations and notifies operation information to a control unit 205.

A communication unit 204 includes a communication circuit that communicates with the external vehicle service providing server 106 and message transmission server 105 via the network 103. For example, the communication unit 204 performs communication compliant with standards such as LTE-Advanced and connects to the network 103.

The control unit 205 includes a CPU 210, which is a central processing unit, and a ROM 211, which is a non-volatile memory. The control unit 205 controls the units of the control unit 205 and controls the operations of the units of the information providing apparatus 200, by the CPU 210 extracting and executing a program stored in the ROM 211 in a memory 216. The functions of the control unit 205 may be realized by one CPU 210 or may be realized using a further CPU or a GPU which is not shown.

Figure 5A:
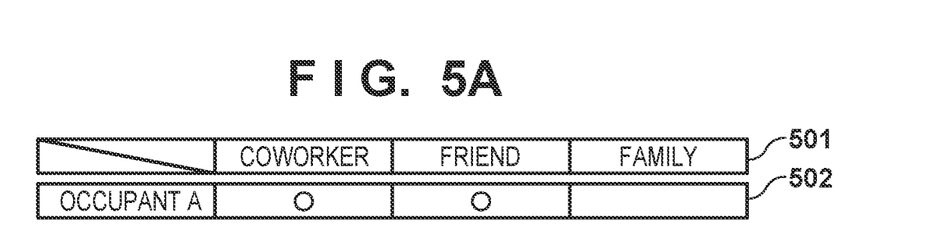
FIG. 5A is a diagram illustrating an example of occupant relationship definition information according to the first embodiment.

An occupant relationship generation unit 206 generates attribute information (occupant relationship definition information) between a specific occupant and the other occupants, and records the generated attribute information to a recording unit 215, for example. For example, the occupant relationship generation unit 206 is able to generate occupant relationship definition information based on an operation instruction input via the operation unit 203 by an occupant of the vehicle. For example, as shown by 501 in FIG. 5A, attributes such as family, friend and coworker can be set as attributes between occupants. Also, as shown by 502 in FIG. 5A, in the case where the specific occupant and an occupant A are both friends and coworkers, for example, a plurality of attributes, namely, the "friend" attribute and the "coworker" attribute, can be set in the occupant relationship definition information. Also, the occupant relationship generation unit 206 may infer the attribute shared between persons based on information such as person information identified by a person identification unit 207 described later and social graph information received from the SNS web service 104 via the communication unit 204, and generate occupant relationship definition information (after the inferred attribute has been confirmed by the occupants of the vehicle). Alternatively, the occupant relationship generation unit 206 may acquire, from the vehicle service providing server 106, attribute information shared between occupants registered in the past from the same vehicle or another vehicle, and add the acquired attribute to the occupant relationship definition information.

The person identification unit 207 executes identification processing for identifying occupants. The person identification unit 207 identifies occupants based on facial images from the camera 201 (or utterance information from the sound sensor 202) and feature amounts related to faces or utterances that are included in occupant information registered in the recording unit 215 beforehand, and specifies identification information of occupants to be processed. The person identification unit 207 may be further provided with a function for inferring the gender and age of occupants and a function of deriving the resemblance of faces, from facial images or utterance information.

An address determination unit 208 determines whether a received message is information that is addressed to a specific occupant among a plurality of occupants inside the vehicle. For this purpose, the address determination unit 208 acquires the address information that is included in the message received from the message transmission server 105. If the sender of the message designates a plurality of addresses, the address information of the message includes a plurality of addresses. Address information includes an email address, a telephone number, and user identification information of a social networking service, for example. The processing by the address determination unit 208 will be described later.

An output control unit 209 functions as an output control unit capable of outputting received messages in a manner perceptible to a plurality of occupants from at least one of a panel display unit 212, a navigation display unit 213 and a sound output unit 214 that function as output units. For example, the output control unit 209 specifies the attribute shared between occupants that is to be preferentially taken into consideration in order to control the output mode (control attribute specification processing), and controls the output mode of received messages based on the specified control attribute (output control processing). The control attribute specification processing and the output control processing will be described in detail later.

The panel display unit 212 includes a display panel such as an LCD or an OLED, for example, and performs processing such as presenting information to be displayed to the driver and displaying various measurement values of the vehicle such as the speed of the vehicle. The panel display unit 212 functions as an output unit for displaying received messages, and although perceptible to a plurality of occupants, messages that are output are mainly output so as to be readily perceived by the driver. The navigation display unit 213 includes a display panel such as an LCD or an OLED, for example, and displays a navigation screen, menu screens for various settings and various operations, and an operation screen for occupant registration. Also, the navigation display unit 213 functions as an output unit for displaying received messages. Messages that are output are output so as to be perceived by a plurality of occupants inside the vehicle who are looking at the navigation display unit 213.

The sound output unit 214 includes a speaker disposed inside the vehicle, for example, and navigation sounds, warning sounds and the like are output. Also, the sound output unit 214 functions as an output unit that outputs received messages as sound. The messages that are output are output so as to be perceived without a plurality of occupants inside the vehicle looking in a specific direction.

The recording unit 215 includes a nonvolatile recording medium such as a semiconductor memory or an HDD, for example, and records setting values required in the operations of the information providing apparatus 200 and the abovementioned occupant information and occupant relationship definition information. The memory 216 includes a volatile storage medium such as a DRAM, for example, and temporarily stores parameters for the CPU 210 to execute programs, processing results and the like.

Processing related to Occupant Registration

Figure 3:
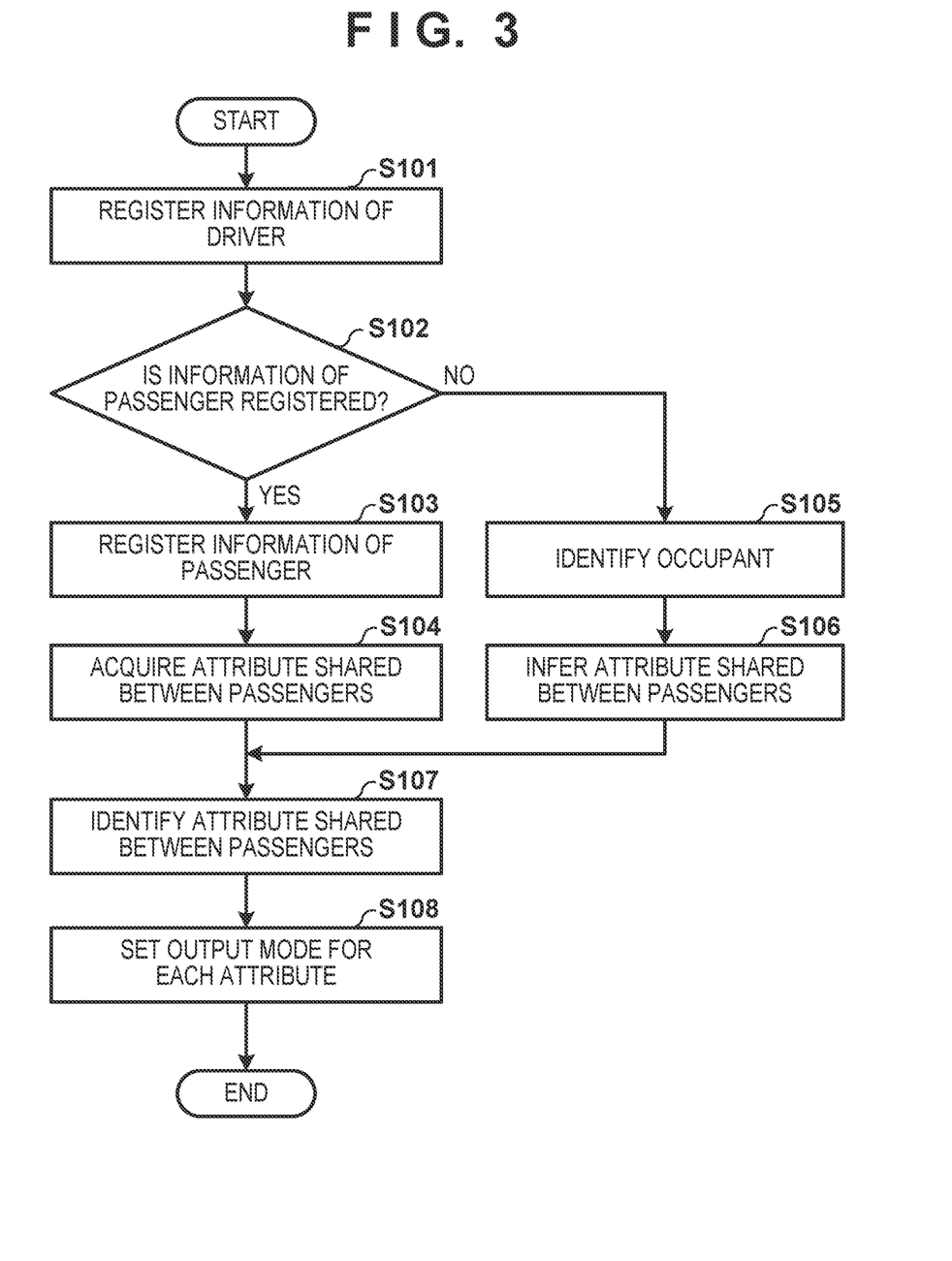
FIG. 3 is a flowchart showing operations of occupant registration processing according to the first embodiment.

Next, occupant registration processing will be described, with reference to FIG. 3. Note that, in this processing, processing that the control unit 205 shown in FIG. 2 and the functional blocks thereof execute as the agent is realized by the CPU 210 executing a program.

In step S101, the control unit 205 accepts an operation instruction from the driver via the operation unit 203, and registers occupant information of the driver. The occupant information of the driver is registered as occupant information with respect to the identification information of the driver. For example, the control unit 205 registers settings (address information, user information related to the message service, etc.) for messages that are transmitted to the driver to be received with the information providing apparatus 200. Also, the control unit 205 acquires facial images from the camera 201 and sound from the sound sensor 202, extracts a feature amount related to the face or utterances of the driver that is used in identifying the driver, and registers the extracted feature amount in the occupant information.

In step S102, the control unit 205 determines whether to register information of a passenger. For example, the control unit 205 advances the processing to step S103 in the case where an operation instruction indicating to register information of a passenger is input from the driver, and advances the processing to step S105 in the case where an operation instruction indicating not to register information of a passenger is input, via the operation unit 203.

In step S103, the control unit 205 accepts an operation instruction from the driver via the operation unit 203, and registers occupant information of a passenger. The occupant information of a passenger is registered as occupant information with respect to the identification information of that passenger. For example, the control unit 205 registers settings (address information, user information related to a message service, etc.) for messages that are transmitted to the passenger to be received with the information providing apparatus 200. Also, the control unit 205 acquires facial images from the camera 201 or sound from the sound sensor 202, extracts a feature amount related to the face or utterances of the passenger that is used in identifying the passenger, and registers the extracted feature amount in the occupant information. In the case where there are a plurality of passengers, the control unit 205 registers occupant information for the plurality of passengers.

In step S104, the control unit 205 accepts an operation instruction from the driver via the operation unit 203, and acquires an attribute shared between the driver and the passenger. The driver is able to set attributes such as family, friend and coworker, for example, as the case may be. In the case where the driver and the passenger are both friends and coworkers, the driver is able to set the two attributes "friend" and "coworker". In the case where there are a plurality of passengers, the attribute shared between the driver and the passenger is acquired for the plurality of passengers.

In step S105, the control unit 205 identifies the passenger. For example, the person identification unit 207 infers the gender and age of the passenger using the facial image from the camera 201, or determines the resemblance between the driver and the passenger.

In step S106, the control unit 205 infers the attribute shared between the driver and the passenger (or the attribute shared between passengers). The occupant relationship generation unit 206 infers the attribute to be family, in the case where the passenger is inferred to be a child and the facial resemblance is high, for example. Alternatively, the occupant relationship generation unit 206 may infer whether the driver and the passenger are friends or coworkers, based on information such as facial image information and social graph information or user information received from the SNS web service 104. The control unit 205 displays the inference result on the navigation display unit 213, and accepts confirmation by the driver. Also, the control unit 205 infers the attributes between other registered occupants and passengers who are included in the address information of the message, and accepts confirmation by the driver.

In step S107, the control unit 205 registers the attribute shared between the driver and the passenger (and the attribute shared between passengers) acquired in step S104 and step S106 as occupant relationship definition information. The control unit 205 writes the occupant relationship definition information to the recording unit 215.

In step S108, the control unit 205 sets the display mode for the case where there is an occupant who is not included in the address information of the message. For example, the control unit 205, having displayed a setting menu on the navigation display unit 213, accepts an operation instruction from the driver via the operation unit 203, and sets the display mode for the respective attributes "coworker", "friend" and "family". That is, an occupant is able set the output mode for the attribute shared between the occupant to which the message is addressed and other occupants. Furthermore, the display mode settings can also be configured, for each of the attributes, so as to change the display mode, according to the type of message that is received. Exemplary setting of the display mode by attribute will be described later. The control unit 205 ends this processing when set display mode setting information is recorded to the recording unit 215 based on an operation instruction from the driver.

Control Attribute Specification Processing

Figure 4:
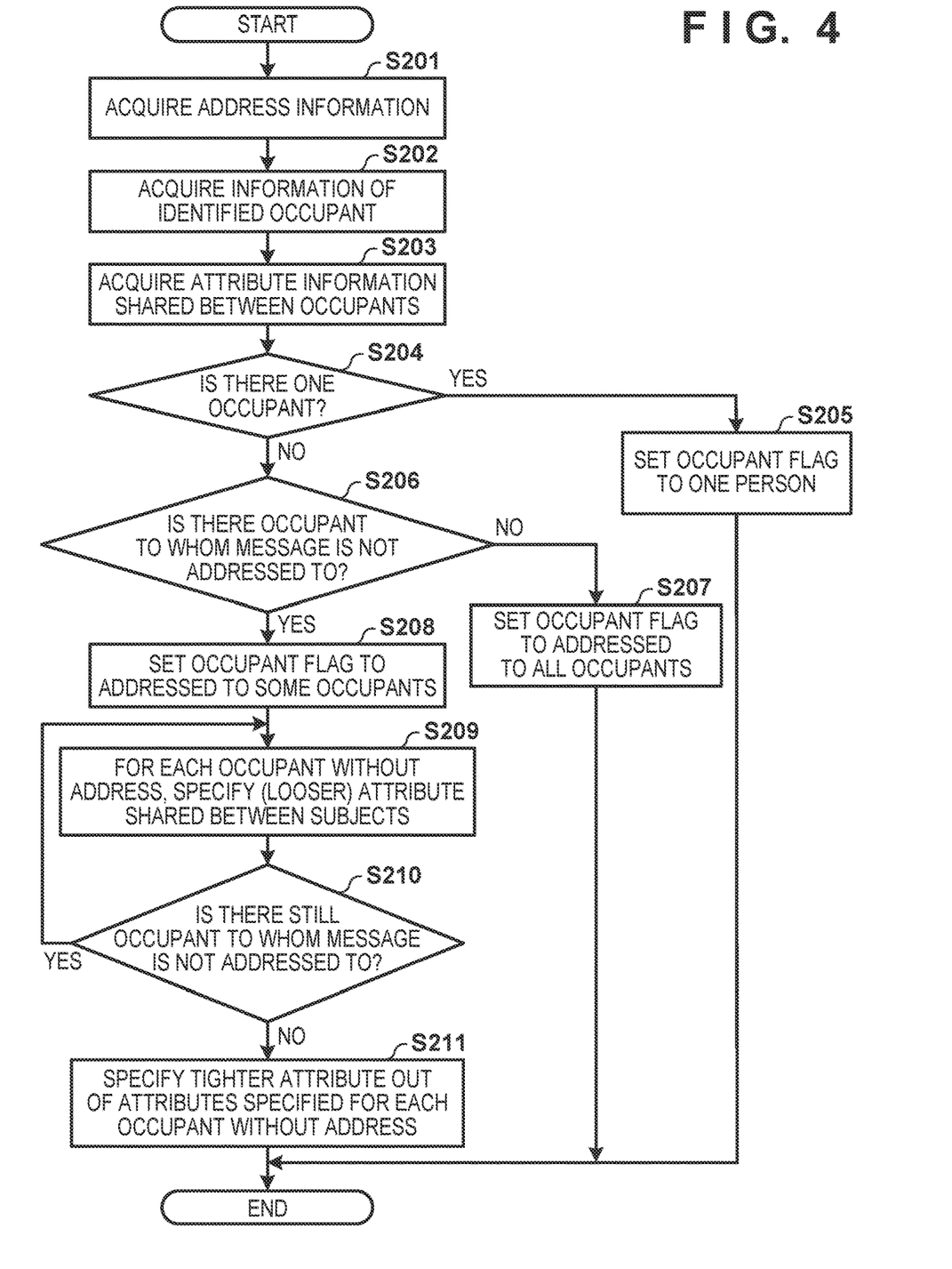
FIG. 4 is a flowchart showing operations of control attribute specification processing according to the first embodiment.

Next, control attribute specification processing will be described, with reference to FIG. 4. Note that, in this processing, processing that the control unit 205 shown in FIG. 2 and the functional blocks thereof execute as the agent is realized by the CPU 210 executing a program. Also, this processing is executed when the communication unit 204 receives a message from the message transmission server 105, for example, after the abovementioned occupant registration processing has been performed beforehand.

In S201, the control unit 205 acquires address information. Specifically, the address determination unit 208 acquires the address information that is included in the message received from the message transmission server 105. In the case where a plurality of addresses are designated in the address information of the message, plural pieces of address information are acquired.

In S202, the control unit 205 acquires information of the identified occupant. For example, the address determination unit 208 reads out the occupant information of the occupant identified by the person identification unit 207 from the recording unit 215. In S203, the address determination unit 208 reads out occupant relationship definition information from the recording unit 215, and acquires attribute information shared between the occupants.

In S204, the address determination unit 208 determines whether the number of occupants recognized by the person identification unit 207 is one person, for example. The address determination unit 208 advances the processing to step S205 if it is determined that the number of occupants is one, and advances the processing to step S206 if the number of occupants is more than one.

In step S205, the address determination unit 208 sets an occupant flag to a value indicating "one person", and records the set occupant flag to the memory 216. The occupant flag is information indicating the occupancy situation of occupants inside the vehicle.

In step S206, the address determination unit 208 determines whether there is an occupant who is not included in the address information of the received message. That is, the address determination unit 208 determines whether the received message is a message that is addressed to a specific occupant among the plurality of occupants inside the vehicle. For example, the address determination unit 208 compares the occupant information of the occupants recognized by the person identification unit 207 with the occupant information of the occupants that are included in the address information of the received message. At this time, an occupant whose address information was not registered in abovementioned occupant registration processing will be an occupant who is not included in the address information of the message among the occupants recognized by the person identification unit 207. The address determination unit 208 advances the processing to step S207, if it is determined that all of the occupants are included in the address information of the received message. On the other hand, the address determination unit 208 advances the processing to step S208, if it is determined that there is an occupant who is not included in the address information of the received message (i.e., the received message is addressed to a specific occupant among the plurality of occupants).

In step S207, the address determination unit 208 sets the occupant flag to a value indicating "addressed to all occupants", and records the set occupant flag to the memory 216. On the other hand, in step S208, the address determination unit 208 sets the occupant flag to a value indicating "addressed to some occupants", and records the set occupant flag to the memory 216.

Figure 5B:
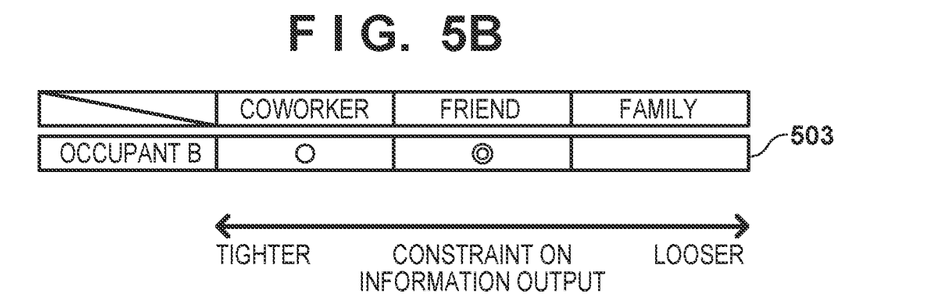
FIG. 5B is a diagram illustrating an example of occupant relationship definition information according to the first embodiment.

In step S209, the output control unit 209 specifies the attribute shared between the specific occupant (also referred to as the subject) who is included in the address information of the message and the occupant who is not included in the address information. For example, in the case where the attribute shared between the subject and the occupant B who is not included in the address information is only "family", the output control unit 209 specifies the "family" attribute. On the other hand, in the case where two or more attributes are set between the specific person and the occupant B who is not included in the address information, the output control unit 209 specifies one of the attributes between the specific person and the occupant B who is not included in the address information, in accordance with a predetermined order of priority of a constraint on output information that is based on the attribute. For example, the output control unit 209 determines the order of priority of the constraint on output information, as shown in FIG. 5B, so as to loosen the constraint on output information in the following order of attributes: coworker→friend→family. In the example of 503 shown in FIG. 5B, the attribute "friend" which has the looser constraint on output, out of "coworker" and "friend", is specified. By adopting this configuration, an occupant who receives a message is able to share the information of the received message with the occupant B to the widest possible extent.

In step S210, the output control unit 209 determines whether there is a further occupant who is not included in the address information of the message, among the occupants recognized by the person identification unit 207. The output control unit 209 returns the processing to step S209 in order to repeat the processing of step S209 if it is determined that there is a further occupant who is not included in the address information of the message, and advances the processing to step S211 if this is not the case.

Figure 5C:
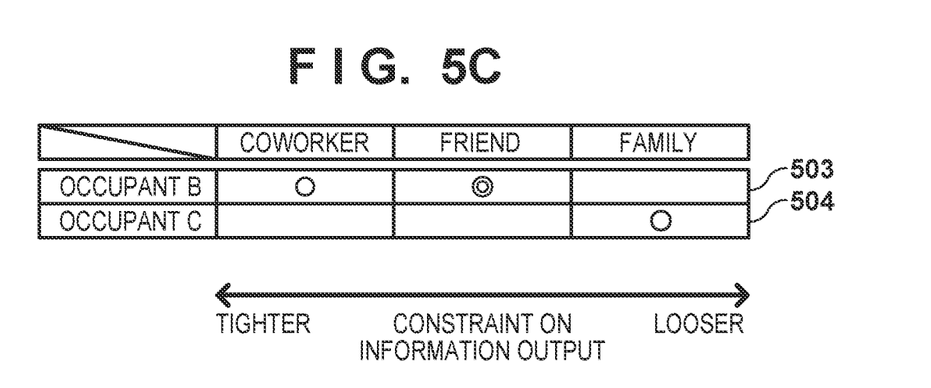
FIG. 5C is a diagram illustrating an example of occupant relationship definition information according to the first embodiment.

In step S211, the output control unit 209 specifies an attribute having a tighter constraint on output information among the attributes specified for each occupant who is determined in step S209 to not be included in the address information of the message. For example, the output control unit 209 specifies one attribute having a tighter constraint on output information, in accordance with the abovementioned order of priority related to the constraint on output information. For example, the output control unit 209 specifies the attribute "friend" having a tighter constraint, out of the attribute "friend" specified between the subject and the occupant B and the attribute "family" specified between the subject and the occupant C, as shown with the examples of 503 and 504 in FIG. 5C. By adopting this configuration, it is possible, in the case where the occupants are the occupant B who is a friend and the occupant C who is family, to avoid outputting more information than necessary to the friend (even though it may be information that can be output to family). The output control unit 209, upon specifying the control attribute for performing output control, records the specified control attribute to the memory 216 as control attribute information. The control unit 205 thereafter ends the control attribute specification processing.

Output Control Processing

Figure 6:
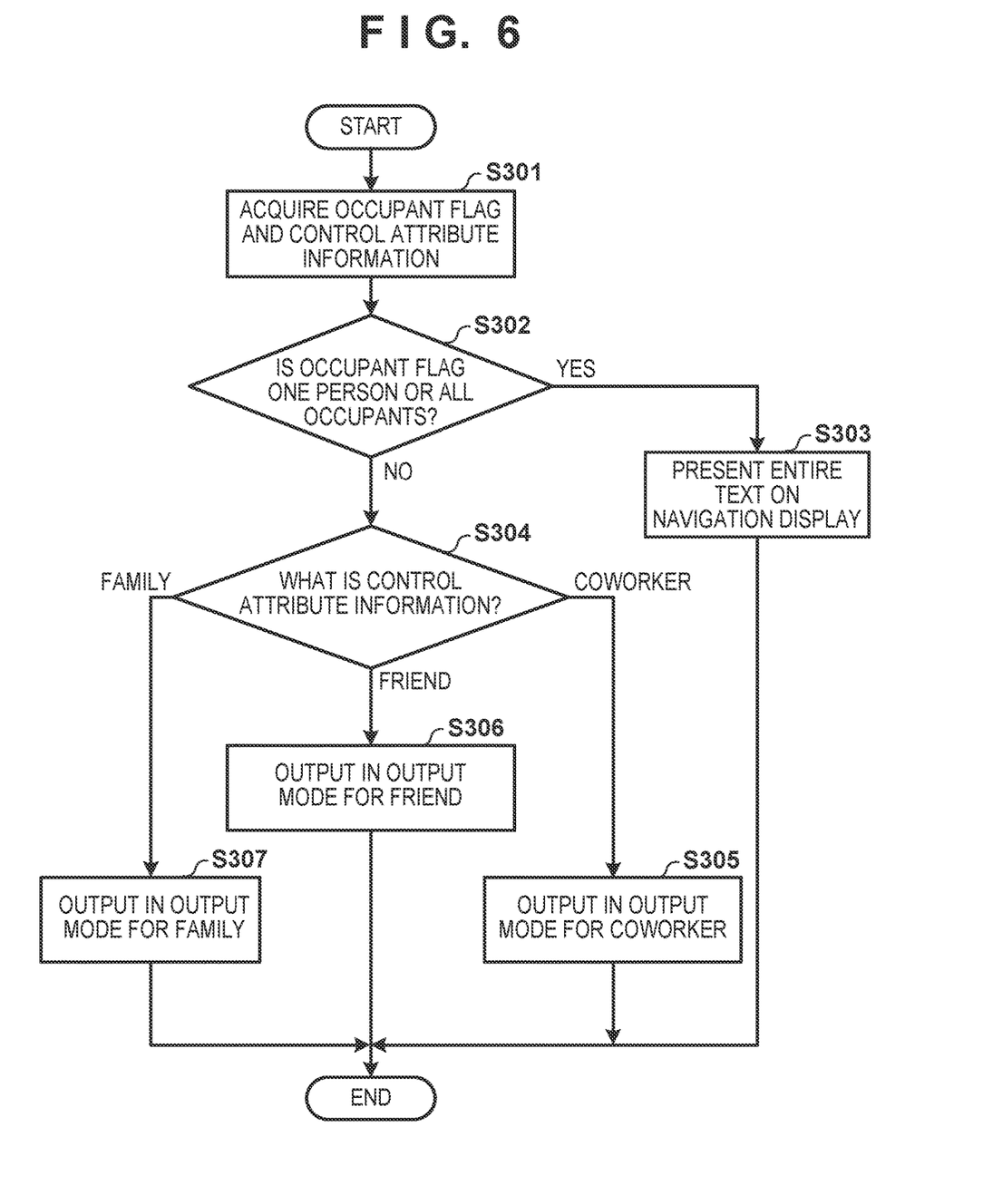
FIG. 6 is a flowchart showing operations of output control processing according to the first embodiment.

Next, output control processing will be described, with reference to FIG. 6. Note that, in this processing, processing that the control unit 205 shown in FIG. 2 and the functional blocks thereof execute as the agent is realized by the CPU 210 executing a program. Also, this processing is executed when the control attribute specification processing has been completed.

In step S301, the output control unit 209 acquires the occupant flag and the control attribute information that were set in the abovementioned control attribute specification processing from the memory 216. In step S302, the output control unit 209 determines the content of the occupant flag. The output control unit 209 advances the processing to step S303 if the content of the occupant flag is "one person" or "addressed to all occupants", and advances the processing to step S304 if this is not the case. In step S303, the output control unit 209 performs output so as to present the entire text of the received message on the navigation display unit 213, for example. That is, in the case where the content of the occupant flag is "one person" or "addressed to all occupants", the entire text of the message may be presented since only persons concerned with the received message are inside the vehicle.

In step S304, the output control unit 209 determines the control attribute information. The output control unit 209 advances the processing to step S305 if the control attribute information indicates "coworker", advances the processing to step S306 if the control attribute information indicates "friend", and advances the processing to step S307 if the control attribute information indicates "family".

In step S305, the output control unit 209 acquires the display mode setting information set in step S108 from the recording unit 215, and controls output of the received message in the display mode set for the attribute "coworker". In step S306, the output control unit 209 acquires the display mode setting information set in step S108 from the recording unit 215, and controls output of the received message in the display mode set for the attribute "friend". In step S307, the output control unit 209 acquires the display mode setting information set in step S108 from the recording unit 215, and controls output of the received message in the display mode set for the attribute "family".

Figure 7:
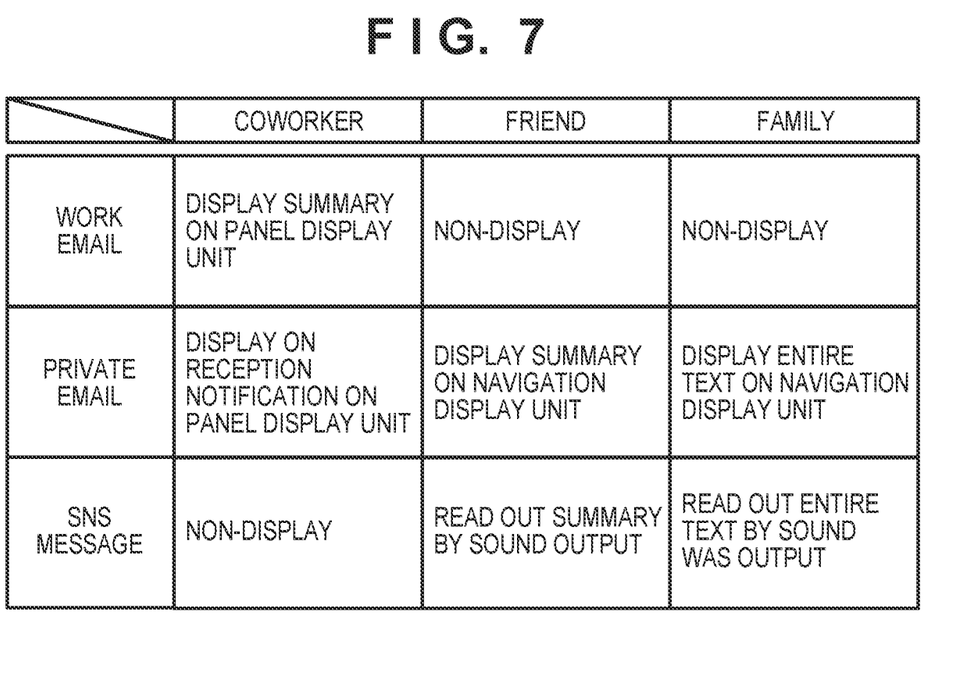
FIG. 7 is a diagram showing an example of display modes that depend on message type and attributes between persons.

Here, exemplary settings of the display mode setting information set in step S108 and exemplary controls of specific display modes are as shown in FIG. 7. In the display mode setting information, the information amount of the message to be output, the type of output device that outputs the message, and the type of perception mode (sound or image) can be respectively differentiated, according to the attribute shared between occupants and the type of message.

For example, if the received message is an email relating to work, in the case where the attribute specified in step S211 is "coworker" (i.e., there is an occupant who is a coworker to which the message is not addressed inside the vehicle), a summary of the message is displayed on the panel display unit 212. Also, if the received message is a private email, only a notification indicating that a message has been received is displayed. If the received message is an SNS message, display is not performed. The output control unit 209 generates information of the set output mode, by analyzing and converting information such as the type, content and sender of the received message, according to the display mode setting information.

The present invention is not limited to the example shown in FIG. 7, and the output control unit 209 may change the display mode to one of a mode of outputting only that a message has been received ("email received", etc.), a mode of outputting only the sender of the message, and a mode of outputting a summary of the message, such that the information amount of the message that is output decreases. Also, in the case of outputting with sound, an output mode of reading out being performed by a sound agent is included.

The output control unit 209, upon controlling the received message to be output in the obtained output mode, ends the output control processing.

In the present embodiment as described above, the output mode of a received message is changed, based on the attribute shared between a specific occupant to whom the message is addressed and other occupants. By adopting this configuration, it becomes possible to share the information of the message to the maximum extent to which the information may be made known, or conversely to ensure that the information of the message is not made known. That is, it becomes possible, in the case where received information can be output to a plurality of persons, to change the output mode with consideration for the relationship of the persons.

Other Embodiments

In the abovementioned embodiment, the case where the occupant registration processing, the control attribute specification processing and the output control processing are each executed in the information providing apparatus 200 was described as the example. However, at least some of this processing may be executed other than in the information providing apparatus 200, such as in the vehicle service providing server 106, for example. Recognition of occupants and generation of occupant relationship definition information in the occupant registration processing, for example, may be executed in the vehicle service providing server 106. The vehicle service providing server 106 that performs such processing has the configuration shown in FIG. 8, for example.

Figure 8:
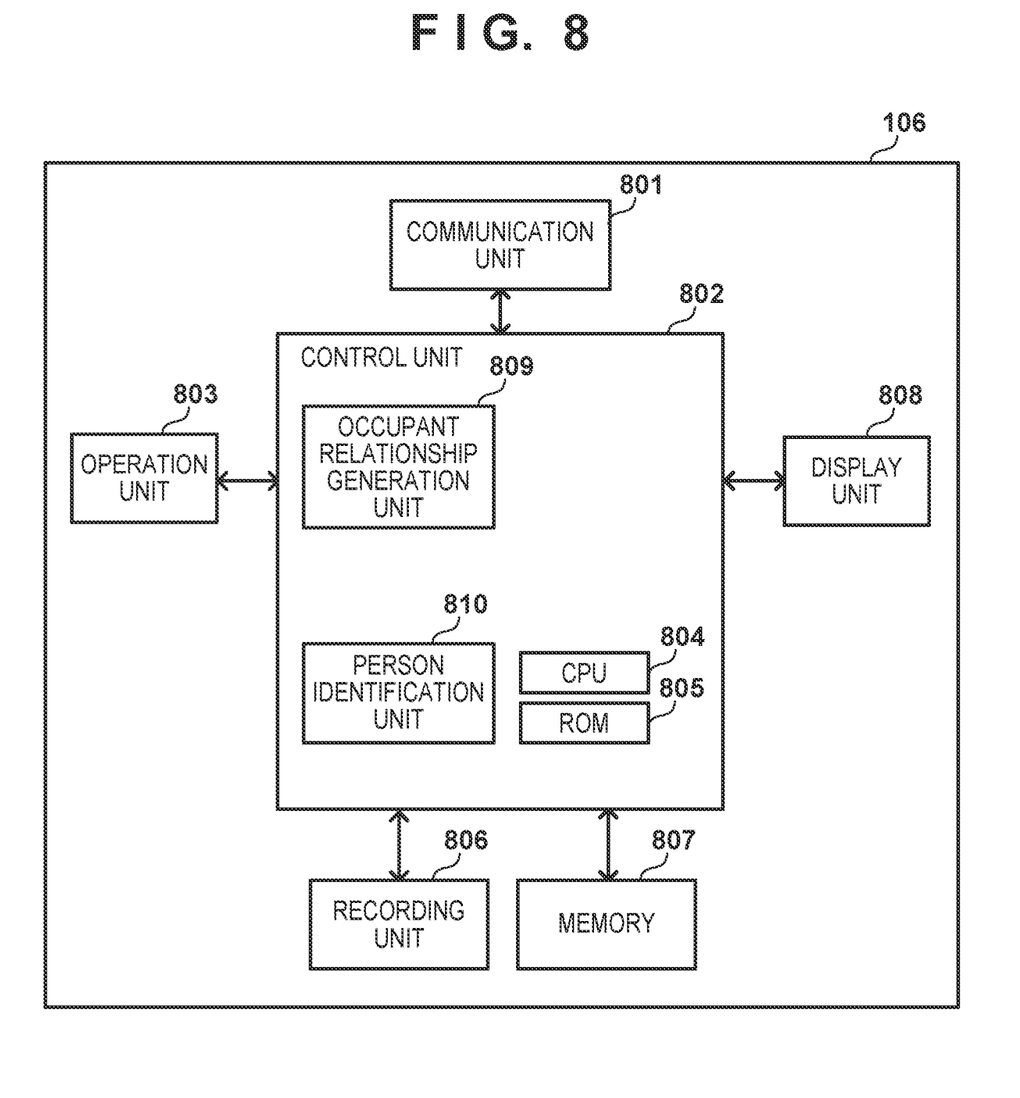
FIG. 8 is a block diagram showing an exemplary functional configuration of a vehicle service providing server in another embodiment.

A communication unit 801 includes a communication circuit that communicates with the information providing apparatus 200 and the SNS web service 104 via the network 103. A control unit 802 includes a CPU 804, which is a central processing unit, and a ROM 805, which is a non-volatile memory. The control unit 802 controls the units of the control unit 802 and the operations of the units of the vehicle service providing server 106, by the CPU 804 extracting and executing a program stored in the ROM 805 in a memory 807. The function of the control unit 802 may be realized by one CPU 210, or may be realized using a further CPU or a GPU which is not shown.

An occupant relationship generation unit 809 generates attribute information (occupant relationship definition information) between a specific occupant and the other occupants of the vehicle 102 and records the generated attribute information to a recording unit 806, for example. Also, the generated occupant relationship definition information is transmitted to the information providing apparatus 200 of the vehicle 102. For example, the occupant relationship generation unit 809 is able to generate occupant relationship definition information based on an operation instruction (designated value of an attribute, etc.) by an occupant of the vehicle, a camera image or the like received from the information providing apparatus 200. Also, the occupant relationship generation unit 809 may infer the attribute shared between persons based on information such as person information identified by a person identification unit 810 and social graph information received from the SNS web service 104 via the communication unit 801. In this case, the occupant relationship generation unit 809 may generate occupant relationship definition information, by transmitting the inference result to the information providing apparatus 200, and receiving confirmation by an occupant of the vehicle 102.

The person identification unit 810 executes identification processing for identifying occupants. The person identification unit 810 receives facial images from the camera 201 (or utterance information from the sound sensor 202) of the information providing apparatus 200, identifies the occupants, and specifies the identification information of the occupant to be processed. The control unit 802 transmits the identification result to the information providing apparatus 200, via the communication unit 801. The person identification unit 810 may be further provided with a function of inferring the gender and age of occupants and a function of deriving a facial resemblance, from the facial images or utterance information received from the information providing apparatus 200.

The recording unit 806 includes a nonvolatile recording medium such as a semiconductor memory or an HDD, for example, and records setting values required in the operations of the vehicle service providing server 106, and the abovementioned occupant information and occupant relationship definition information. The memory 807 includes a volatile storage medium such as a DRAM, for example, and temporarily stores parameters for the CPU 804 to execute programs, processing results and the like.

An operation unit 803, such as a mouse or a keyboard, for example, inputs instructions for operating the vehicle service providing server 106, and notifies the input instructions to the control unit 802. A display unit 808 includes a display monitor such as a monitor or the like, for example.

In the case of using such a vehicle service providing server 106, the abovementioned information providing apparatus 200 need only transmit an operation instruction from the driver and a facial image or sound to the vehicle service providing server 106, in steps S101 to S108 of the occupant registration processing. The vehicle service providing server 106 performs processing such as generating occupant information of the driver and passengers, recognizing occupants, and generating occupant relationship definition information, according to the operation instruction, facial image information and the like, and transmits the generated information to the information providing apparatus 200. In the case of performing occupant recognition processing and occupant relationship inference processing with the vehicle service providing server 106, learning using a larger amount of data can be performed, or larger scale algorithms (e.g., neural network, etc.) that require large-scale calculation resources can be used. That is, a more accurate processing result can be obtained.

Also, the vehicle service providing server 106 may acquire the address information of a received message from the information providing apparatus 200, for example, and may generate occupant relationship definition information related to occupants, and transmit the generated occupant relationship definition information to the information providing apparatus 200.

Furthermore, the vehicle service providing server 106 may specify the output mode by performing output control processing, using the generated occupant relationship definition information, and transmit information indicating the specified output mode to the information providing apparatus 200. In this case, the information providing apparatus 200 need only output the message, in accordance with the information indicating the output mode transmitted from the vehicle service providing server 106.

Also, in the above embodiment, an example was described in which the information providing apparatus 200 receives messages using the communication unit 204 thereof, but the vehicle service providing server 106 may receive messages from the message transmission server 105, determine the addresses, and perform output control processing. In this case, the vehicle service providing server 106 need only transmit information indicating the output mode and information of the message changed according to the output mode to the information providing apparatus 200.

Summary of Embodiment

1. An information providing apparatus (e.g., 200) of the above embodiment includes:

a receiving unit (e.g., 204) configured to receive a message;

an output control unit (e.g., 209) configured to output the received message in a manner perceptible to a plurality of persons; and a determination unit (e.g., 208) configured to determine whether the received message is a message addressed to a specific person among the plurality of persons, the output control unit, in a case where it is determined by the determination unit that the received message is a message addressed to the specific person, changing an output mode of the received message, based on an attribute shared between the specific person and another person among the plurality of persons (e.g., step S206, steps S304-S307).

According to the present embodiment, in the case where a received message can be output in a manner perceptible to a plurality of persons, the output mode can be changed with consideration for the relationship of the persons. That is, it is possible to add to the atmosphere among a plurality of persons by outputting a received message, and to ensure that received messages are not output unnecessarily.

2. In the above embodiment, the output control unit changes an information amount of the received message to be output, based on the attribute shared between the specific person and the other person (e.g., FIG. 7).

According to the present embodiment, it becomes possible to increase or decrease the information amount that is perceived by another person, according to the relationship with the other person. For example, the entire text of the message to be output is displayed in the case where the relationship with the other person is as family, whereas the information amount of the message to be output can be reduced in the case where the relationship with the other person is as a coworker.

3. In the above embodiment,
the output control unit, in a case where the information amount of the received message to be output is reduced according to the attribute shared between the specific person and the other person, changes the output mode to one of a mode of outputting only that the received message has been received, a mode of outputting only a sender of the received message, and a mode of outputting a summary of the received message (e.g., steps S305-S307, FIG. 7).

According to the above embodiment, display modes in which the amount of a message that is output differs in a stepwise manner can be selectively used.

4. In the above embodiment,
the output control unit changes the output mode so as to output the received message from a different output unit (e.g., 212, 213, 214), based on the attribute shared between the specific person and the other person.

According to the above embodiment, output units that differ in ease of perception by a plurality of persons can be used for different purposes.

5. In the above embodiment,
the output control unit:
includes a specifying unit configured to specify the attribute shared between the specific person and the other person (e.g., step S209), and
changes the output mode of the received message, based on the attribute specified by the specifying unit (e.g., step S304).

According to the above embodiment, a fast response can be obtained for processing that is performed whenever a message is received, by performing processing for specifying the attribute shared between persons in the output control unit.

6. In the above embodiment,
the specifying unit, in a case where there are a plurality of attributes between the specific person and the other person, specifies an attribute with a looser constraint on output, among the plurality of attributes (e.g., step S209, step S210).

According to the above embodiment, in the case where the occupants are both coworkers and friends, for example, the information of the received message can be shared to the widest possible extent.

7. In the above embodiment,
the specifying unit, in a case where there are a plurality of other persons, specifies an attribute with a tighter constraint on output, among the attributes between each of the other persons and the specific person (e.g., step S211).

According to the above embodiment, in a case where there is a person who is a friend and a person who is family, it is possible to ensure that more information than necessary is not output to the friend (even though it may be information that can be output to family).

8. The information providing apparatus of the above embodiment further includes:
a setting unit configured to set the output mode for the attribute shared between the specific person and the other person, for each type of the received message (e.g., FIG. 7) (e.g., step S108), and
the output control unit further changes the output mode, according to the setting by the setting unit (e.g., steps S305-S307).

According to the above embodiment, it is possible to change the output mode according to the characteristics of each type of message.

9. In the above embodiment,
the plurality of persons are persons who are in an interior space of a vehicle.

According to the above embodiment, it is possible to add to the atmosphere by outputting a received message to a plurality of persons who are in the interior space of a vehicle, and to ensure that received messages are not output unnecessarily.

10. The information providing apparatus of the above embodiment further includes:
an identification unit configured to identify the plurality of persons (e.g., step S105).

According to the above embodiment, the time and effort involved in a person who is present at the time manually conveying information relating to a plurality of persons to the apparatus each time can be reduced.

11. The information providing apparatus of the above embodiment further includes:
an inference unit configured to infer the attribute shared between the plurality of persons recognized by the identification unit (e.g., step S106).

According to the above embodiment, the time and effort involved in a person who is present at the time manually conveying information relating to a plurality of persons to the apparatus each time can be reduced.

12. In the above embodiment,
the specific person is a person who is set so as to receive the message with the information providing apparatus (e.g., step S101).

According to the above embodiment, it is possible to add to the atmosphere among a plurality of persons by outputting a received message to a person who has been set to receive messages with the information providing apparatus, and to ensure that received messages are not output unnecessarily.

13. A control method of an information providing apparatus of the above embodiment that includes a receiving unit (e.g., 204) configured to receive a message and an output control unit (e.g., 209) configured to output the received message in a manner perceptible to a plurality of persons, the method including:
a determination step of determining, using a determination unit (e.g., 208), whether the received message is a message addressed to a specific person among the plurality of persons (e.g., 206); and
an output control step of changing, using the output control unit, in a case where it is determined in the determining step that the received message is a message addressed to the specific person, an output mode of the received message, based on an attribute shared between the specific person and another person among the plurality of persons (steps S304) (e.g., steps S305-S307).

According to the above embodiment, an apparatus capable of outputting received messages in a manner perceptible to a plurality of persons can be controlled to change the output mode with consideration for the relationship of the persons. That is, it is possible to add to the atmosphere among a plurality of persons by outputting a received message, and to ensure that received messages are not output unnecessarily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information providing apparatus comprising:
a receiving unit configured to receive a message;
one or more processors; and
a memory storing instructions which, when the instructions are executed by the one or more processors, cause the information providing apparatus to function as:
an output control unit configured to output the received message in a manner perceptible to a plurality of persons; and
a determination unit configured to determine whether the received message is a message addressed to a specific person among the plurality of persons,
wherein the output control unit, in a case where it is determined by the determination unit that the received message is a message addressed to the specific person, changes an output mode of the received message, based on a predetermined personal relationship between the specific person and another person among the plurality of persons and,
the output control unit further identifies a first personal relationship between the specific person and a first person in the plurality of persons and a second personal relationship, that is different from the first personal relationship, between the specific person and a second person in the plurality of persons, and selects the predetermined personal relationship from the first personal relationship and the second personal relationship according to a predetermined priority order.

2. The information providing apparatus according to claim 1, wherein the output control unit changes an information amount of the received message to be output, based on the predetermined personal relationship between the specific person and the other person.

3. The information providing apparatus according to claim 2, wherein the output control unit, in a case where the information amount of the received message to be output is reduced according to the predetermined personal relationship between the specific person and the other person, changes the output mode to one of a mode of outputting only that the received message has been received, a mode of outputting only a sender of the received message, and a mode of outputting a summary of the received message.

4. The information providing apparatus according to claim 1, wherein the output control unit changes the output mode so as to output the received message with a different output unit, based on the predetermined personal relationship between the specific person and the other person.

5. The information providing apparatus according to claim 1, wherein the predetermined priority order represents a looser constraint on output.

6. The information providing apparatus according to claim 1, wherein the predetermined priority order represents a tighter constraint on output.

7. The information providing apparatus according to claim 1, further comprising a setting unit configured to set the output mode for the predetermined personal relationship between the specific person and the other person, for each type of the received message, and
wherein the output control unit further changes the output mode, according to the setting by the setting unit.

8. The information providing apparatus according to claim 1, wherein the plurality of persons are persons who are in an interior space of a vehicle.

9. The information providing apparatus according to claim 1, further comprising an identification unit configured to identify the plurality of persons.

10. The information providing apparatus according to claim 9, further comprising an inference unit configured to infer the predetermined personal relationship between the plurality of persons recognized by the identification unit.

11. The information providing apparatus according to claim 1, wherein the specific person is a person who is set so as to receive the message with the information providing apparatus.

12. A control method of an information providing apparatus that includes a receiving unit configured to receive a message and an output control unit configured to output the received message in a manner perceptible to a plurality of persons, the method comprising:
determining whether the received message is a message addressed to a specific person among the plurality of persons; and
changing, in a case where it is determined in the determining that the received message is a message addressed to the specific person, an output mode of the received message, based on a predetermined personal relationship between the specific person and another person among the plurality of persons,
wherein the changing further includes identifying a first personal relationship between the specific person and a first person in the plurality of persons and a second personal relationship, that is different from the first personal relationship, between the specific person and a second person in the plurality of persons, and selecting the predetermined personal relationship from the first personal relationship and the second personal relationship according to a predetermined priority order.

* * * * *